Aug. 11, 1953

R. E. RISLEY ET AL 2,648,551

PIPE COUPLING

Filed June 1, 1949

INVENTORS
ROGER E. RISLEY
AND GEORGE D. KISH
BY

ATTORNEY.

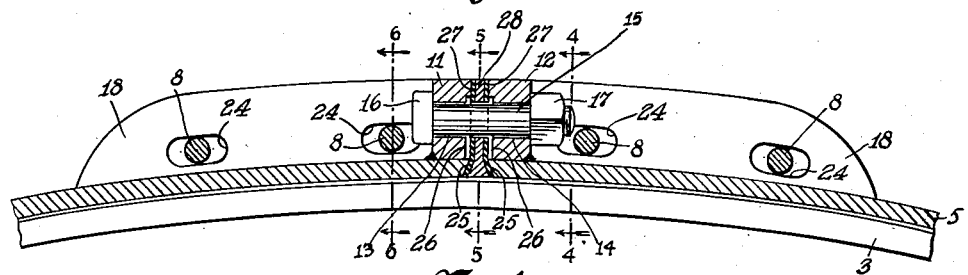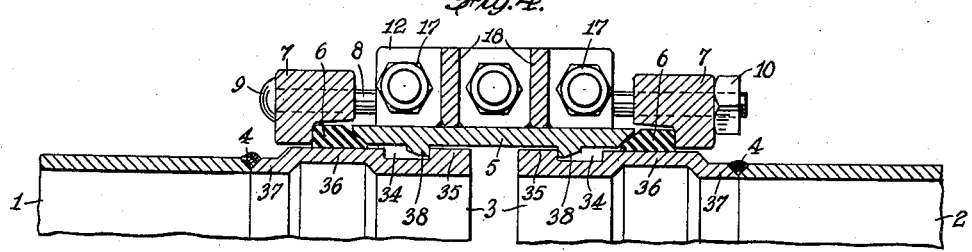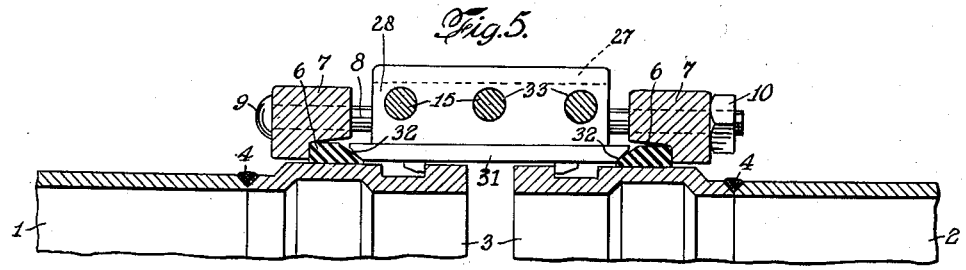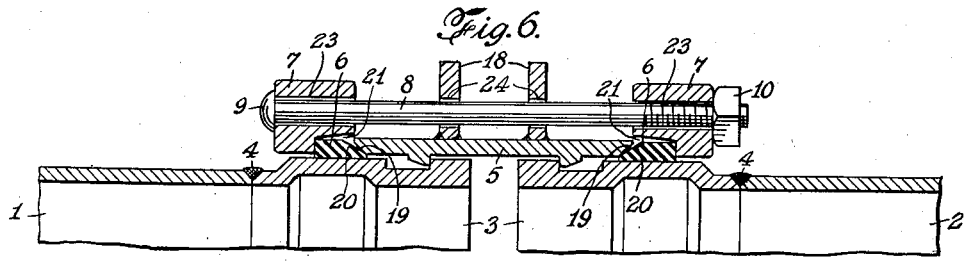

Aug. 11, 1953 R. E. RISLEY ET AL 2,648,551
PIPE COUPLING
Filed June 1, 1949 3 Sheets-Sheet 3
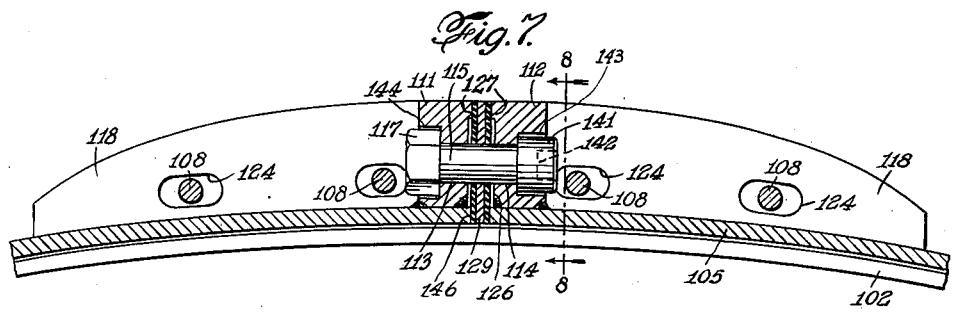
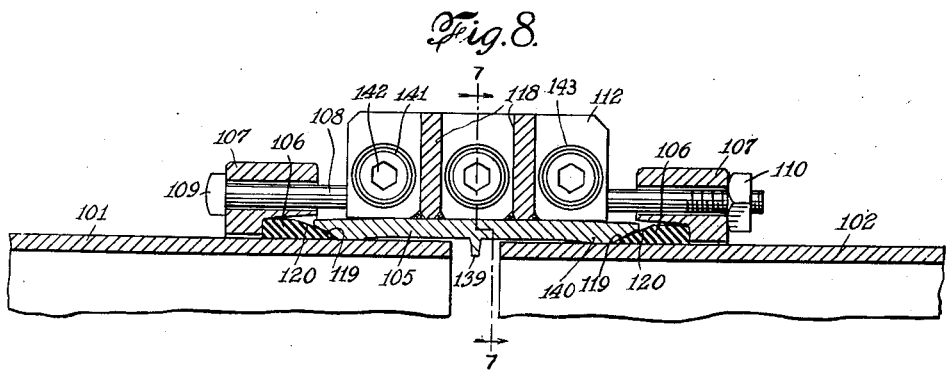
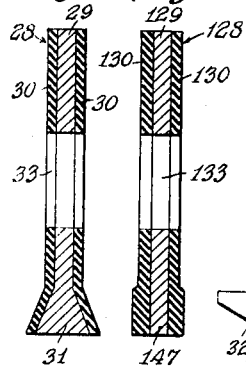
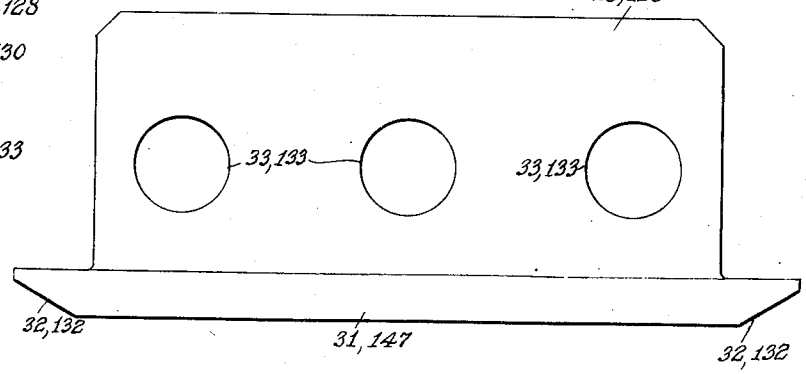
INVENTORS
ROGER E. RISLEY
AND GEORGE D. KISH
BY
Robert E. Burns
ATTORNEY Patented Aug. 11, 1953

2,648,551

UNITED STATES PATENT OFFICE 2,648,551

PIPE COUPLING

Roger E. Risley and George D. Kish, Bradford, Pa., assignors to Dresser Industries, Inc., Cleveland, Ohio, a corporation of Pennsylvania Application June 1, 1949, Serial No. 96,416

5 Claims. (Cl. 285—142)

The present invention relates to gasket sealed pipe couplings and particularly to an improved coupling for large diameter pipe such as penstocks.

In the manufacture of a suitable coupling for use on large diameter pipe such as penstocks, several problems are encountered which arise from the fact that large diameter pipe has in most cases a small wall thickness in relation to its diameter and therefore tends to become distorted under certain field conditions, or even under the influence of the weight of the pipe itself. In addition, it is very difficult to manufacture large diameter pipe with the desired accuracy as to roundness and size.

As described in our co-pending application, Serial No. 98,298, filed June 10, 1949, now Patent No. 2,588,573, these problems may be solved by using a coupling comprising a flexible sleeve member surrounding the pipe at the joint, which sleeve member is split at one place transversely of its circumference and is provided with means for drawing the split ends toward one another. In this way the sleeve member may be drawn closely around the pipe, acting like a band which tends to conform to the circumferential shape of the pipe when the coupling is installed, and bends with the pipe in any subsequent flexing due to earth loads or other causes. Furthermore, the clearance between the pipe wall and the sleeve member may be reduced to a minimum, or even to zero, when the latter is drawn up, thus assuring the most favorable conditions for a fluid-tight seal.

When a pipe coupling with a split sleeve is used, however, it is necessary to provide effective means for sealing the transverse split in the sleeve when the pipe coupling is applied to the pipe, and to prevent undesirable distortion of the sleeve member due to uneven stresses caused by the pull on the sleeve ends at the split when the latter is drawn up. Such distortion might produce undue clearance between the pipe wall and sleeve member at some places of the circumference of the coupling, which clearances would unfavorably affect the sealing properties of the coupling.

It is an object of the present invention to provide a satisfactory and lasting fluid-tight pipe coupling, in particular for large diameter pipe. Another object of our invention is to provide a pipe coupling for large diameter pipe comprising a flexible sleeve member split at one place of its circumference, which may be drawn closely around the pipe with a very small and substantially uniform or even zero clearance over the whole length of its circumference. A further object of our invention is to provide reliable and effective sealing means for sealing the transverse split in a pipe coupling of the character described above.

In accordance with our invention, the coupling comprises a flexible sleeve member split transversely of its circumference and provided with cross-bars or the like to form outwardly projecting opposed flange-like portions extending across the sleeve at the split ends thereof, between the opposed faces of which split ends and cross-bars a compressible packing shim is placed for sealing the transverse split. According to a preferred embodiment of my invention, this packing shim is made of a hard, for instance metal, core with a coating of an elastic material such as rubber or the like, and is adapted to be compressed between the split ends and between the cross-bars near the outer edges thereof, thus preventing the latter from heeling over; furthermore, the sleeve may be provided with gusset portions extending backward over a substantial distance from the split ends to evenly distribute the stresses caused by the pull on the split ends when they are drawn toward each other. In this way a correct relationship of the cross-bars may be maintained and an undue distortion of the split ends of the sleeve member is prevented.

Other objects and advantages of our invention will appear from the following description and claims in conjunction with the accompanying drawings, which illustrate by way of example one embodiment of the invention.

In the drawings:

Figure 3 is a sectional view taken approximately on the line 3—3 of Figure 1;

Figure 4 is a sectional view taken approximately on the line 4—4 of Figure 3;

Figure 5 is a sectional view taken approximately on the line 5—5 of Figure 3;

Figure 6 is a sectional view taken approximately on the line 6—6 of Figure 3;

Figure 7 is a sectional view similar to the one of Figure 3 of another embodiment of the invention, i. e. taken on the line 7—7 of Figure 8;

Figure 8 is a sectional view similar to the one of Figure 4 of the embodiment of Figure 7, i. e. taken on the line 8—8 of Figure 7;

Figure 9 is a sectional view on an enlarged scale of a packing shim used in the embodiment shown in Figures 1 through 6;

Figure 10 is a sectional view on an enlarged scale of a packing shim used in the embodiment shown in Figures 7 and 8;

Figure 11 is a front view of the packing shim shown in Figures 9 and 10.

Figure 1:
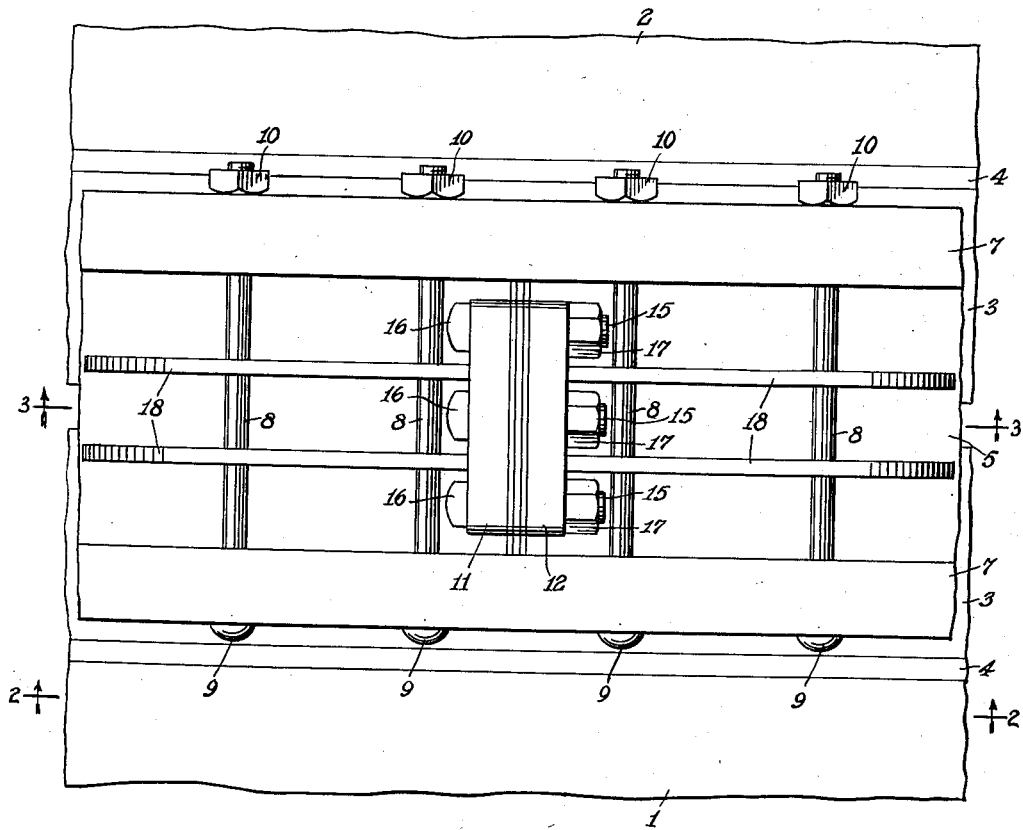
Figure 1 is a fragmentary plan view showing an embodiment of a coupling in accordance with our invention, applied to the adjoining ends of two pipe sections.
Figure 2:
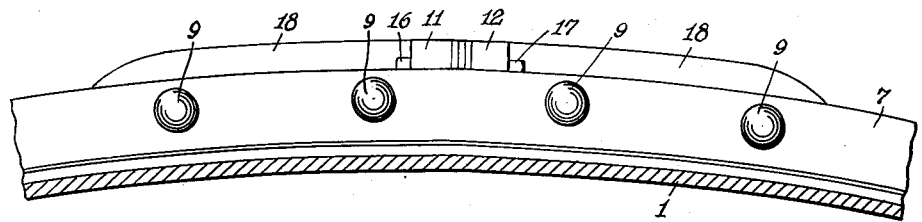
Figure 2 is a sectional view taken approximately on the line 2—2 of Figure 1.

Referring now to Figures 1 through 6, a pipe coupling embodying our invention is shown as a coupling for joining the ends of two pipe sections of large diameter, the end portions 1 and 2 of the sections being shown. The coupling may be applied to these end portions 1 and 2 or, as shown, to end rings 3 welded to these end portions at 4.

The coupling comprises a middle ring or sleeve 5 extending around the end rings 3, two annular gaskets 6 at both sides of the sleeve 5, two follower rings 7 adjacent the gaskets 6, and a plurality of bolts 8 with heads 9 and nuts 10 engaging the follower rings 7 to apply sealing pressure to the gaskets 6.

The sleeve 5 is of flexible construction and is split at one place transversely of its circumference, so that it may be expanded or contracted by drawing the split ends away from or toward each other. By the expression "transversely of its circumference" is meant that the sleeve may be split at approximately right angles to its circumference as shown in the drawings, or at such other angles as may be desired.

Two cross-bars 11, 12 are welded to the adjacent ends of the split sleeve, forming two flange-like portions projecting outwardly from the ends. The cross-bars are provided with aligned holes 13, 14 to receive three tangential bolts 15 with heads 16 and nuts 17 threaded thereon, which bolts may be tightened to draw the cross-bars toward one another, the bolt heads 16 pressing against the outer side of the cross-bar 11 and the nuts 17 against the outer side of the cross-bar 12. Although in the embodiment shown, bolts and nuts are used, it will be understood that any equivalent fastening means may be used for drawing the cross-bars together, such stud bolts, cap screws, etc. Owing to its flexibility, the sleeve 5 is thereby drawn closely around the end rings 3, or, if these end rings are omitted, around the ends of the pipe section to be coupled; the sleeve acts in this respect like a band which may be drawn tightly around the pipe, tending to fit closely the shape thereof and leaving a minimum clearance. Thus the best condition for a durable tight sealing by means of the gaskets 6 on both sides of the sleeve will be obtained under all circumstances.

Two gussets 18 extend rearwardly over a substantial distance from each cross-bar 11, 12 and project outwardly from the sleeve, being united with the cross-bars and the body portion of the sleeve by welding. The gussets serve the purpose of distributing the stresses resulting from the pull of the bolts on the cross-bars and to prevent undue distortion of the end portion of the split sleeve when the cross-bars are drawn up.

The arrangement and construction of the sealing means of both sides of the sleeve 5 may be of any convenient form. In the embodiment shown the arrangement is similar to the one shown and described in the co-pending application, Serial No. 29,104, of Roger E. Risley and George E. Szekely, filed May 25, 1948, for a non-split pipe coupling. The side edges of the sleeve 5 are suitably shaped, for example by being flared or beveled outwardly as indicated at 19 (Figure 6), to provide annular recesses for the gaskets 6 between the sleeve, the follower rings and the pipe or end rings welded thereto. The gaskets 6 are made of rubber or another suitable elastic material and are formed at one side with a tapered or wedge-shaped portion 20 having a cross-sectional form approximately similar to the cross-sectional form of the recesses, which portion 20 is adapted to be pressed into sealing engagement with the walls of the end rings 3 and the beveled surfaces 19. The follower ring 7 may be made from a solid ring with a portion of the inner surface machined away to provide the recesses 21 for receiving the gaskets 6. Each of the follower rings 7 has a number of apertures 23, the respective apertures of the two follower rings being placed in alignment to allow the insertion of the clamping bolts 8 extending between the rings. By tightening the nuts 10 engaging the projecting threaded ends of the bolts 8, the follower rings 7 may be drawn toward each other and toward the sleeve 5 to apply sealing pressure to the gaskets 6. The gussets 18 are provided with elongated holes 24 to let through the bolts 8, that are situated adjacent the split in the sleeve.

In order to obtain a fluid-tight coupling, it is necessary to seal the transverse split in the sleeve 5 when the coupling is applied. To this effect and in accordance with our invention, a compressible sheet-like packing shim may be placed between the opposed split ends of the sleeve and the cross-bars welded thereto, extending across the whole length of the split.

As shown in Figure 3, the split ends are beveled to form an inwardly diverging space enclosed by the two opposed beveled faces 25. Although these faces are shown to form a substantially V-shaped cross-section, it will be understood that the faces 25 need not be flat and may have any other convenient cross-sectional form. The opposed faces of the two cross-bars 11 and 12 have recessed parts 26 set back a small distance from the outer rim of the respective faces 25 of the sleeve ends and have two projecting contact faces 27 extending across the whole length of the bars near the outer edge thereof. The contact faces 27 lie in parallel to one another and are spaced at substantially the same distance as the parallel outer rims of the split end faces 25.

The packing shim for sealing the split in the sleeve is indicated by 28 and shown on an enlarged scale in Figures 9 and 11. In accordance with our invention, this shim consists of a hard core 29, preferably of steel or another metal, which core is covered on both sides with a coating 30 of an elastic material such as rubber or the like. The upper part of the shim 28 has a sheet-like form with parallel sides, which have approximately the same height and length as the cross-bars 11 and 12, while the lower or inner part of the shim is formed into a wedge-shaped portion 31 conforming to the space confined between the opposed split end faces 25. Thus the wedge-shaped portion 31 has the same length as the split and is beveled at both ends at 32 (Figures 5 and 11) to lie flush with the side edges 19 of the sleeve 5 when the shim is applied. The shim has three apertures 33 to let through the bolts 15.

When the shim 28 is placed in position in the split and the bolts 15 are drawn up, the rubber coating of the wedged portion 31 is pressed into sealing engagement with the split end faces 25, thus sealing the split in the sleeve over its whole length between the two gaskets at both sides thereof. At the same time the outer edge of the shim is pressed between these two contact faces 27 of the cross-bars 11, 12, making flat contact therewith.

The wedge-shaped portion 31 tends to make the shim self-packing and prevents the shim from being blown out from between the cross-bars by the internal pressure in the pipe. A further advantage of the wedge-shaped edge of the shim lies in the fact that it makes the shim, to a great extent, self-locating. The holes 33 in the shim, through which the bolts 15 pass, provide preliminary locative means during the phase of installation of the coupling, while the cross-bars are opened up and sleeve is in an expanded condition. After the cross-bars are drawn up, the bolts 15 provide a safety retentive means, while allowing sufficient freedom to permit the shim to float inwardly against the pipe.

The outer edge of the shim lying compressed between the contact faces 27 of the cross-bars serves the purpose of balancing the cross-bars to prevent heeling over thereof and undue bending of the sleeve at the extremity of the gussets 18, when the cross-bars are drawn toward each other. Generally considerable force will be required to bring the faces of the cross-bars and split ends close enough together to effect sealing relationship with the shim placed therebetween and to reduce the clearance usually required between the sleeve and the pipe during field assembly to a minimum or zero. Therefore, tightening of the bolts 15 would tend to stretch the gussets 18, distorting the end portion of the sleeve, and bend over the cross-bars 11, 12, bringing the outer edges thereof closer together than the inner edges. This will be effectively prevented by using long gussets as described above in combination with the use of the contact faces 27 at the outer edges of the cross-bars spaced by the interjacent shim portion.

As shown in Figure 9, the wedge-shape of the portion 31 of the shim 28 is obtained by making the steel core 29 wedge-shaped adjacent the under edge and using a coating 30 of uniform thickness. It will also be possible, however, to give the coating of the portion 31 a greater uniform thickness or a gradually increasing thickness and form the core accordingly.

In the embodiment shown in Figures 1 through 6, specially formed end rings 3 are shown shop-welded to the pipe ends 1 and 2, the feature of the split coupling sleeve being capitalized on to provide the end rings with recesses adapted to interengage with projections on the inner surface of the sleeve 5 to form a lock joint. The coupling as described above may, however, also be used in combination with plain end pipe such as shown in Figures 7 and 8, which figures will be described later on.

The arrangement of this locking device as shown especially in Figure 4 is similar to the one shown and described in our co-pending application, Serial No. 98,298, filed June 10, 1949. The end rings 3 have for the greater part an outer diameter somewhat greater than that of the pipe and are provided with an annular recess or groove 34 in their outer surface, which groove separates the cylindrical end portion 35 around which the sleeve 5 is drawn from the cylindrical portion 36 which serves primarily as the contacting surface for one of the gaskets 6. At their welding ends 37 the end rings have the same diameter as the pipe ends 1, 2, to which they are welded at 4. The sleeve 5 has at its inner surface two annular lips 38 projecting inwardly and adapted to engage the grooves 34, thus interlocking the end rings 3 and the sleeve 5. Because of its flexibility, the sleeve may be expanded somewhat to permit the insertion of the end rings with their end portions passing the lips 38 until the latter can engage the grooves 34. The grooves 34 have a greater width than the lips 38 to allow some movement and deflection of the end rings with respect to the sleeve.

When the end rings have been properly inserted into the loosely assembled coupling, the tangential bolts are tightened to draw the sleeve closely around the end rings and to press the packing shim 28 between the split ends and cross-bars 11 and 12 of the sleeve. The thickness of the shim may be chosen such that the sleeve fits the end rings with a minimum clearance when sealing relationship at the split is obtained, in order to provide the best condition for a durable and secure fluid-tight seal when the gaskets 6 are thereupon pressed between the side edges 19 of the sleeve and the surface 36 of the end rings on the drawing-up of the follower rings 7.

The use of end rings permits the manufacture thereof in connection with the manufacture of the coupling, thus assuring a uniform and accurate relationship between these members, so that the packing shims may all be of the same thickness. However, shims of various thickness may be held on hand to permit effective sealing of the transverse splits under circumstances where for some reason variations in the respective circumferential dimensions may be expected. The effective thickness of the shim is preferably varied by changing the thickness of the steel core 29 thereof without changing the thickness of the rubber coating 30. This feature is, in particular, of importance when the lips 38 of the sleeve 5 are omitted and the coupling is intended to be applied directly to the plain end pipe. By having several shims of various thicknesses on hand at the time of field assembly, it is possible to select the right thickness of shim which will provide the minimum clearance between the sleeve and the pipe. This latter feature makes the coupling according to the invention in particular suitable for high pressure work such as encountered in penstock application where the lengths of pipe are generally individually anchored to foundations.

In a preferred form of installation, the combination of circumferential length of the sleeve and shim thickness is such to provide zero clearance between the sleeve and the pipe at the split, thus permitting the pipe to provide locative means for positioning the shim in the course of the installation.

An embodiment of a coupling according to our invention, suitable for connecting plain end pipe, is shown in Figures 7 and 8, which embodiment also incorporates a modification of the split sealing means. It is to be understood, however, that this modification can also be used in combination with the locking feature of the embodiment of Figures 1 through 6, just as the coupling shown there can be adapted for use on plain end pipe.

In Figures 7 and 8 the parts corresponding to those of Figures 1 through 6 are indicated by the same numerals with 100 added thereto. Thus the coupling comprises a split sleeve member 105, which surrounds the plain ends 101 and 102 of the pipe section to be coupled, two annular gaskets 106 with a wedge-shaped portion 120 adapted to be pressed between the beveled side edges 119 of the sleeve 105 and the outer surface of the pipe ends 101, 102, and two follower rings 107 connected by screw bolts 108 with heads 109 and nuts 110 threaded thereon to draw the rings toward one another for applying sealing pressure to the gaskets 106. The sleeve 105 is preferably provided with an inwardly projecting flange or series of projections 139 adapted to abut against the pipe ends 101, 102, to assure proper positioning of the sleeve with respect to the pipe ends. The middle section of the sleeve 105 has a somewhat larger inner diameter than the outer sides 140 of the sleeve, so as to allow some deflection of the pipe end with respect to the sleeve.

The cross-bars 111, 112 at the split end of the sleeve are of a heavier design than the cross-bars 11, 12 of the embodiments shown in Figures 1 through 6 and also larger tangential bolts 115 are used for drawing the cross-bars toward one another. The three tangential bolts 115 pass through pairs of aligned holes 113, 114 in the cross-bars and have round heads 141 with axial hexagonal sockets 142 adapted to receive a wrench for tightening the bolts. The use of the socket-head cap screws makes it possible to counter-bore circular recesses 143 in the outer side of the cross-bar 112 to accommodate the increased height of head. The bolts 115 have nuts 117 threaded onto them, which nuts are likewise counter-sunk in recesses 144. By counter-sinking the heads 141 and nuts 117, the distance between the two follower bolts 108 situated adjacent the split in the sleeve may be left unincreased (Figure 7).

Again, outwardly projecting gussets 118 with apertures 124 for accommodating the follower bolts 108 are provided, welded to the sleeve and the cross-bars and extending backward from the latter over a substantial distance.

The opposed faces of the cross-bars 111, 112 have recessed parts 126 set back a small distance from the outer rim of the split ends and projecting parts forming two opposed parallel contact faces 127 at the outer edge of the cross-bars and spaced substantially the same distance as the split ends. The arrangement of the sealing means of the split differs, however, from the one shown in Figures 1 through 6 in that the opposed faces of the split ends of the sleeve form two parallel faces 146 lying in substantially the same planes as the contact faces 127 of the cross-bars, and in that the sheet-like packing shim 129 to be placed between the split ends and cross-bars for sealing the split in the sleeve has parallel sides over its whole height.

As shown in Figures 10, the shim 129 consists of a sheet-like hard, for instance steel, core 147 covered with an elastic rubber coating 130, holes 133 being provided to let through the tangential bolts 115. The lower part 147, that is the sealing part of the shim, extends across the whole length of the split, ending at both sides with beveled portion 132 corresponding to the beveled side edges 119 of the sleeve. This part 147 of the shim contacting the split end faces 146 of the sleeve has a thicker coating than the rest of the shim in order to favor positive compression where it is needed most.

The desired tolerances with regard to the distances between the contact faces 127 on the one hand and the split end faces 146 on the other hand are furthermore preferably chosen so as to favor compression of the packing shim and the split in the sleeve rather than at the outer edge of the cross-bars.

What has been said in connection with the wedge-shaped packing shim 29 applies also to the shim 129, i. e. the thickness of the shim may be varied by changing the thickness of the core, and is preferably chosen such that sealing relationship is obtained when the sleeve is drawn with a minimum or zero clearance around the pipe.

What we claim and desire to secure by Letters Patent is:

1. In a pipe coupling of the character described, a resilient sleeve member split transversely of its circumference, two rectangular cross-bars projecting outwardly from said sleeve member at the split ends thereof and having aligned bolt holes, the opposed faces of said cross-bars lying somewhat receded from the respective outer edges of the split ends of said sleeve member and having near their outer edges jutting out portions forming two opposed parallel contact faces lying at approximately the same distance from each other as said outer edges of said split ends, bolts in said holes for drawing said cross-bars toward each other to draw said sleeve member closely around the pipe, a substantially rectangular compressive side packing adapted to be placed between said split ends and said cross-bars for sealing the split in said sleeve member, said side packing consisting of a hard core with a coating of an elastic material on each side of said core, the core and coatings of said side packing being substantially coextensive with one another and with said cross-bars and the split ends of said sleeve, said packing thus having a continuous compressive portion that is pressed between the opposed faces of said split ends of said sleeve member to provide a fluid tight seal, and a substantially equal continuous compressive portion that extends the length of said cross-bars and is pressed between said contact faces of said cross-bars, when the latter are drawn up.

2. In a pipe coupling of the character described, a sleeve member split transversely of its circumference, and having its opposed split ends beveled in opposite directions to provide an inwardly divergent space between said ends, two opposed rectangular cross-bars projecting outwardly from said sleeve member at the split ends thereof and having aligned bolt holes, bolts in said holes for drawing said cross-bars toward one another to draw said sleeve member closely around the pipe, a rectangular compressive side packing between said split ends and said cross-bars for sealing the transverse split in said sleeve member, said side packing comprising a hard core having a flat portion held between said cross-bars and having an inwardly diverging wedge-shaped inner edge portion corresponding to the space between said beveled split ends, and a covering of elastic material on each side of said core, said core and coverings being substantially coextensive with one another and with said cross-bars and split ends and said side packing having such a thickness that its wedge-shaped part is pressed into sealing engagement with said beveled faces of said split ends when the cross-bars are drawn up.

3. In a pipe coupling of the character described, a sleeve member split transversely of its circumference and forming at its split ends two opposed flat parallel faces, two rectangular cross-bars projecting outwardly from said sleeve member at the split ends thereof and having aligned bolt holes, the opposed sides of said cross-bars lying somewhat receded from the respective faces of said split ends and having near their outer edge jutting out portions forming two opposed parallel contact faces lying approximately in the same plane as said opposed split end faces, bolts in said holes for drawing said cross-bars toward one another to draw said sleeve member closely around the pipe, and a rectangular side packing between said split ends and said cross-bars for sealing the split in said sleeve member, said side packing being substantially coextensive with the opposed faces of the sleeve members and cross-bars and consisting of a hard sheet-like core with holes for said bolts and with parallel faces covered with a coating of an elastic material substantially coextensive with said core, said coating having a sealing area of greater thickness adjacent the inner edge of the side packing where the latter contacts said split end faces, said core having such a thickness that said sealing area is pressed into sealing engagement with said split end faces of said sleeve member and that the outer edge portion of said side packing is pressed between said jutting out contact faces of said cross-bars, when the latter are drawn up.

4. In a pipe coupling, a sleeve member split transversely of its circumference and outwardly flared at its ends to provide annular gasket seats at the ends of said sleeve, two cross-bars projecting outwardly from said sleeve member at the split ends thereof and having aligned bolt holes, the cross-bars being shorter than said sleeve so that the split ends of the sleeve project lengthwise beyond the cross-bars at both ends, bolts in said holes for drawing said cross-bars toward each other, a compressive side packing positioned between said split ends and cross-bars and being substantially coextensive with the opposed faces of said split ends and cross-bars with holes for said bolts and tapered projecting portions lying between the projecting portions of said split ends, annular gaskets at the ends of said sleeve and means for pressing said annular gaskets into sealing engagement with the pipe to be coupled, the gasket seats of said sleeve and end portions of said side packing, said side packing comprising a core of relatively hard material and a substantially coextensive covering of softer elastic material, said harder core extending into said projecting portions of the side packing and resisting displacement by the edgewise pressure of the annular gaskets on the side packing.

5. In a pipe coupling, a sleeve member split transversely of its circumference and having its ends bevelled outwardly to provide annular gasket seats at its opposite ends, cross-bars projecting outwardly from said sleeve at opposite sides of the split and having aligned bolt holes, the cross-bars being shorter than said sleeve so that the split ends of the sleeve project lengthwise beyond the cross-bars at both ends, bolts in said holes for drawing said cross-bars toward each other, a compressive side packing between said split ends and cross-bars and substantially coextensive with the opposed faces of said split ends and cross-bars, with holes for said bolts and tapered projecting portions lying between the projecting portions of said split ends, annular gaskets at the ends of said sleeve and means for pressing the annular gaskets into sealing engagement with the pipe to be coupled, the gasket seats of the sleeve and end portions of the side packing, said side packing comprising a metal core covered on both sides with rubber-like material, said core extending into said projecting portions of said side packings and resisting displacement of said portions by the edgewise pressure of the annular gaskets on the adjacent portions of the side packing.

ROGER E. RISLEY.
GEORGE D. KISH.

References Cited in the file of this patent

UNITED STATES PATENTS

| Number | Name | Date |
|---|---|---|
| 1,813,529 | Clark | July 7, 1931 |
| 1,816,421 | Clark et al. | July 28, 1931 |
| 1,940,729 | Pfefferle | Dec. 26, 1933 |
| 1,978,019 | Haushalter | Oct. 23, 1934 |
| 2,219,161 | Jacobs | Oct. 22, 1940 |
| 2,387,410 | Roe | Oct. 23, 1945 |
| 2,445,151 | Newell | July 13, 1948 |
| 2,463,235 | Andrews | Mar. 1, 1949 |
| 2,513,178 | Jackson | June 27, 1950 |